Inventors:
Peter Richard Selwood
Richard Lewis Creedon

By: *Spencer & Kaye*
Attorneys

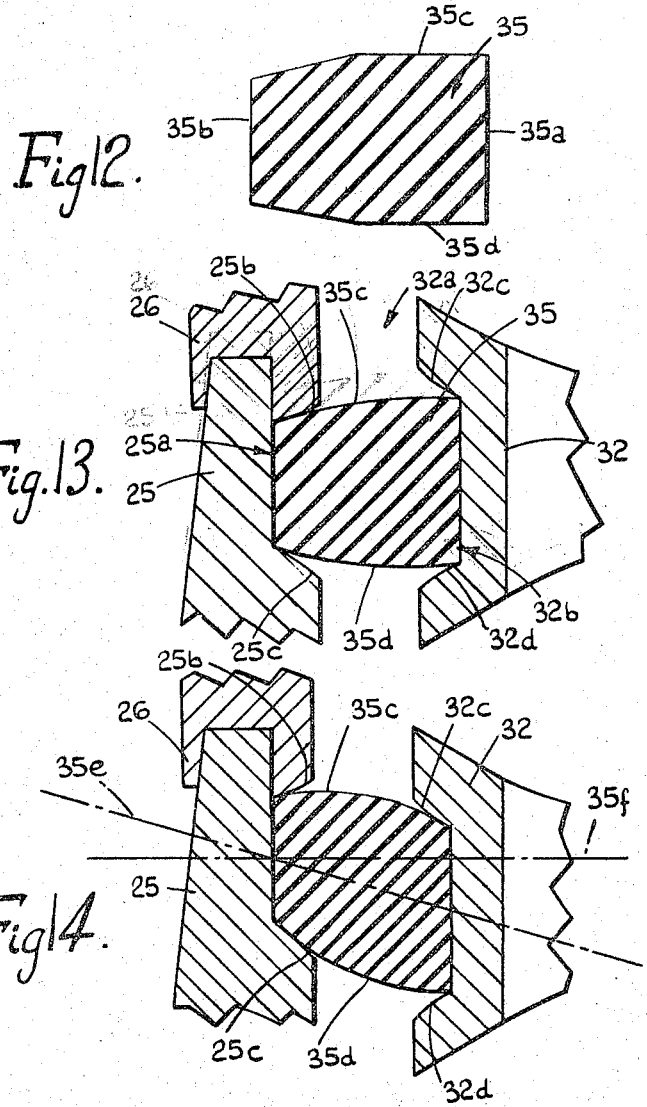

United States Patent Office 3,307,492
Patented Mar. 7, 1967

3,307,492
PUMPS FOR LIQUIDS
Peter Richard Selwood, Compton, near Winchester, and Richard Lewis Creedon, Chandler's Ford, England, assignors to William R. Selwood Limited, Chandler's Ford, England, a British company
Filed Jan. 18, 1965, Ser. No. 426,004
24 Claims. (Cl. 103—223)

This invention relates to a pump for pumping liquid of the kind comprising a pumping chamber having an inlet and an outlet for the liquid and a liquid accelerating or propulsive element hereinafter referred to as an actuator movable back and forth relatively to the chamber. Such pumps are herein referred to as being of the kind specified.

In conventional constructions of pump of the kind specified the actuator is usually in the form of a piston which engages slidably with the side walls of the pumping chamber. The admission of liquid to the pumping chamber and its delivery is controlled by valve means including an outlet valve associated with the outlet for permitting flow of the liquid only in a forward direction therethrough, and an inlet valve associated with the inlet for permitting flow of liquid only in a forward direction into the pumping chamber. The inlet and outlet may be disposed at or near the same end of the pumping chamber in which case this would contain liquid only on one side of the piston. Alternatively the inlet and outlet may be disposed at opposite ends of the chamber in which case the piston would be provided with a non-return valve permitting liquid to pass from the suction or inlet side of the piston to its pressure or delivery side.

In an alternative conventional construction which is commonly adopted a diaphragm is provided in the pumping chamber instead of a piston and the valve means may be as described in the preceding paragraph.

In yet another form of pump of the kind specified, and which is already known, the actuator is in the form of a disc which is relatively rigid or stiff over a main central region so that this portion of the actuator acts as a piston. The peripheral margin of the disc is relatively more flexible and acts as a non-return flap valve in co-operation with an axially presented seating in the pumping chamber situated at the junction of upper and lower parts of the pumping chamber. The inlet of the pumping chamber communicating with the lower part thereof is equipped with an inlet valve permitting liquid to flow only in a forward direction into the pumping chamber.

In all these conventional constructions of pump of the kind specified the forward velocity of the liquid at any given instant is determined by that of the actuator, and such velocity always falls to zero during movement of the actuator in said reverse direction.

Further the volume of liquid which can pass through for a given number of forward and reverse strokes of the actuator is limited substantially to the volume swept within the pumping chamber by the actuator during its forward strokes.

This last mentioned characteristic of conventional constructions of pump of the kind specified limits the rate of flow of liquid through the pump (volume of liquid passed in a given time). Another factor which contributes to this limitation is that commercially available driving motors such as electric motors or internal combustion engines operate most efficiently within a limited speed range. A further factor is that valves in the pump can operate efficiently only below a certain frequency of operation.

The hydraulic load which the pump is required to meet may vary. The factors of this load which may vary are the suction head against which the liquid has to be raised from the source to the pump, and the pressure head against which the liquid is required to be raised from the pump to the delivery point. These factors are usually dictated by extraneous conditions of operation of the pump. A further factor which is usually a specification or requirement which the pump is required to meet is the rate of flow of liquid.

The principal object of the present invention is to provide a pump which is better adapted efficiently to meet these varying factors or requirements than pumps of conventional construction as hereinbefore referred to. Further advantages of the invention will be apparent from, or will be pointed out in, the following description.

A pump for liquid in accordance with the invention comprises a pumping chamber, an actuator therein movable forwardly and reversely relatively to said chamber and an actuator valve means for producing flow of liquid into and out of said chamber, driving means for so moving said actuator, a slug duct communicating with the said chamber and extending at least downstream thereof, depulser means communicating with said slug duct at a position downstream of said chamber, and a pressure absorbing and restoring means for reducing the peak value of stress which would otherwise be established in said driving means, said actuator, and said chamber, said slug duct having, over a substantial part of its length, a cross sectional area less than that of said chamber measured in each case transversely of the direction of liquid flow, and having a length sufficient to produce forward flow of a volume of liquid per unit time through said slug duct higher than that volume swept by the actuator in the same time in its forward movements.

The rate of delivery of liquid from the pump is not, as in conventional pumps, fixed by the volume swept by the actuator, but is dependent upon the average or equivalent steady rate of flow of liquid in the slug. This substantially adjusts itself to provide an output which increases as extraneous pressure conditions become more favourable. Reduction in the suction head to be overcome at the inlet of the pumping chamber, or reduction in the pressure head against which the liquid is to be delivered at the outlet side of the chamber, is automatically accompanied by an increase in the average rate of flow of liquid in the slug, and hence in the rate of liquid delivery notwithstanding that the driving motor may continue to operate at or near the same speed, so that as a whole the pump automatically adapts itself to operating conditions.

Stated in another way, the rate of delivery of the pump is made dependent upon pressure raised by the actuator between the inlet and outlet of the pumping chamber, such pressure always having a positive value by virtue of the continuous forward motion of the slug.

The invention further relates to the specific form of the actuator. In pumps employing conventional pistons frictional loss and wear takes place because of the sliding movement between the piston and side wall of the pumping chamber and thus is accentuated when an abrasive constituent is entrained in the fluid undergoing pumping. In pumps employing a diaphragm the wholly flexible or elastic character of the diaphragm tends at high pressures of fluid to absorb or nullify the required movement. There is also difficulty in obtaining satisfactory service life.

A further object of the invention is to overcome or reduce these difficulties.

From this aspect we provide in a pump for pumping liquid having an inlet and an outlet connected to a pumping chamber, an actuator movable back and forth relatively to said chamber in a direction such as to have at least a component of axial movement parallel to a side wall of said pumping chamber, driving means for so moving said actuator, and valve means for establishing flow of liquid from said inlet to said outlet in response to movement of said actuator, the improvement wherein said actuator comprises a relatively rigid central portion connected to said driving means and having a peripheral face spaced radially inwardly of the side wall of said pumping chamber to define a clearance space therefrom, a sealing ring of resiliently deformable material having at least a medial portion disposed in said clearance space, said medial portion having a radial dimension in its unstressed state greater than the radial dimension of said clearance space, said sealing ring being thereby maintained in a state of radial compression between said central portion and said side wall, and said medial portion having an axial dimension in its unstressed state which is sufficiently great relatively to its radial dimension to provide fold-free axial expansion of said ring in said clearance space when under said radial compression, and means for retaining said sealing ring in engagement with said central portion and with said side wall non-slidably in the direction of movement of said actuator relatively to said side wall.

Further features of the invention will be described, by way of example, with reference to the accompanying drawings wherein:

FIGURES 12, 13 and 14 are cross-sectional views of one form of sealing ring which may be employed in the pump.

Figure 1:
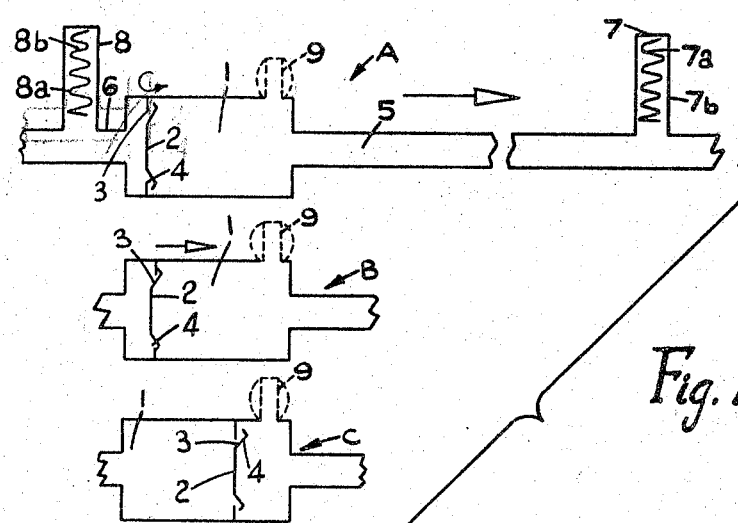
FIGURE 1 illustrates diagrammatically one form of pump in accordance with the invention and its manner of operation.

Referring firstly to FIGURE 1, the basic principle of construction and manner of operation of a pump in accordance with the invention is herein illustrated.

In the view designated A of FIGURE 1 a pumping chamber 1 contains an actuator 2 movable forwardly, that is to say from left to right, and reversely, that is to say right to left in a direction axially of the pumping chamber, by-pass passageway consisting of an annular series of apertures 3 being formed through the actuator. Flow of liquid through these is controlled by an actuator valve means 4 which opens automatically to permit of forward flow of liquid and is closed automatically upon a tendency to reversed flow of liquid.

The pumping chamber which forms part of a duct afforded by the body of the pump as a whole and such duct includes slug duct sections 5 and 6 which are respectively connected to an outlet and inlet of the pumping chamber, and which in combination therewith form a slug duct containing a column or slug of liquid of predetermined length.

At opposite ends of the slug duct are two depulser means 7 and 8 connected respectively to the downstream and upstream ends of the duct sections 5 and 6 remote from the pumping chamber.

The depulser means are represented by boundaries 7b, 8b and by means 7a, 8a for taking in and delivering liquid to the flow path, these latter means being either elastic, or positively operated, e.g. piston and cylinder means, so that in either case the depulser means are, in effect, cyclically operating stores or sources of liquid branched from the flow path.

In some cases the depulser means 8 may be omitted and the length of the slug of liquid is then determined by the inlet end of the duct section 6.

Associated with the assembly consisting of the pumping chamber 1, the actuator 2 and transmission means for operatively connecting the actuator with a driving motor (not shown in FIGURE 1) is a pressure absorbing and restoring means 9 preferably in the form of an elastic body which is shown by way of example as communicating or in contact with liquid in the interior of the pumping chamber but which may, as hereinafter explained, be incorporated in either the actuator itself or in the transmission means for the purpose of modifying the equation of motion of the slug, in comparison with that presented at the primary element of the transmission means from which actuator motion is derived.

Figure 2:
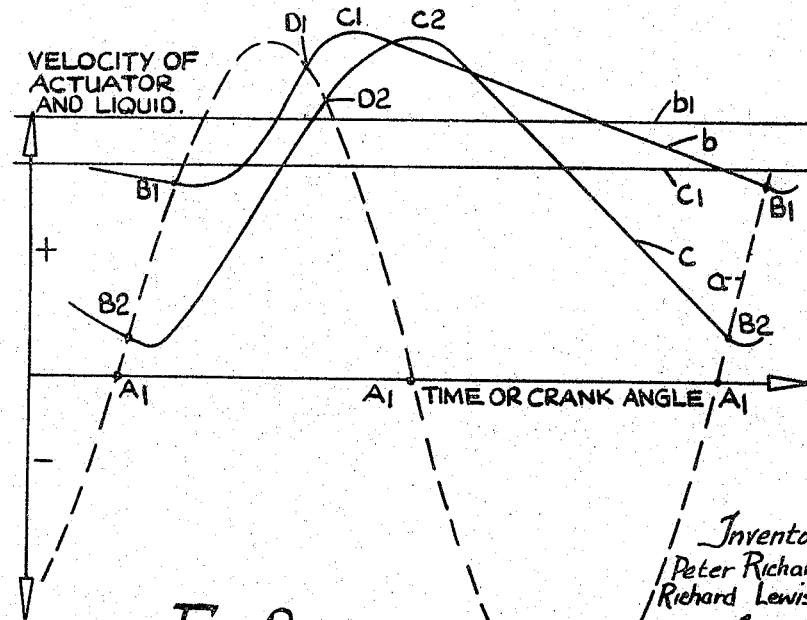
FIGURE 2 is a graph representing the equation of motion of part of the transmission means and the resultant equations of motion of liquid in the slug of the pump under different back pressure conditions.

The general manner of operation of the pump will be best understood by considering FIGURE 1 in relation to the equations of motion represented in FIGURE 2.

The primary element of the transmission means from which actuator motion is derived may comprise an eccentric element such as a crank pin, this being coupled to the actuator 2 by a connecting rod so that as a first approximation the motion of the actuator is a simple harmonic motion. In FIGURE 2 curve $a$ represents the velocity of movement of the actuator plotted as ordinate against time (or crank angle) plotted as abscissa.

Starting at the instant represented by illustration A of FIGURE 1, the actuator is instantaneously at rest, as represented in FIGURE 2, by crossing points of the curve $a$ with the horizontal axis as shown at $A_1$. At this instant the actuator valve means 4 are open and liquid flows through the by-pass passageway 3.

The velocity of liquid flow is represented in FIGURE 2 by the curve $b$ for a low head of liquid and by curve $c$ for a high head of liquid. These curves represent typical limits for the designed range of pressures against which the pump operates.

In illustration B of FIGURE 1 there is shown the instant at which the velocity of forward movement of the actuator just exceeds that of the liquid so that the actuator valve means 4 close automatically in response to the establishment of pressure at the downstream side of the actuator greater than that existing at the upstream side. This instant is represented in FIGURE 2 by the points $B_1$ for curve $b$, and $B_2$ for curve $c$. For simplicity these points are shown at the intersection of curve $a$ with curves $b$ and $c$ rather than just to the right of these intersections where actual closure of the valve 4 will take place.

To the right of the left-hand pair of points $B_1$, $B_2$ the velocity of the liquid tends still to fall slightly due to the fact that some degree of elasticity and hence compressibility exists in the sealing ring of the actuator and the valve means and hence some slight amount of energy is initially consumed in elastically deforming these parts rather than in increasing the velocity of flow, and hence kinetic energy of the liquid. Above a predetermined pressure there is deliberate absorption of energy in the elastic body 9. This is desirable in that it reduces acceleration of the liquid and avoids the establishment of such high pressure presssures as would be reached in the absence of the body 9 and enables a light construction to be adopted for the working parts, namely pumping chamber, actuator, actuator valve means and transmission means.

Thereafter the velocity of the liquid rises, eventually attaining a peak at $C_1$, $C_2$. Such peaks would occur in the absence of any elastic body 9 at the next intersection of curves $b$ and $c$ with curve $a$. This intersection would occur earlier than the points $D_1$, $D_2$ due to the greater acceleration of the liquid. Due to the energy stored in the body 9 and its restoration to the liquid after these intersections $D_1$, $D_2$, the velocity of the liquid continues to rise. Between $D_1$ and $C_1$ or $D_2$ and $C_2$ liquid is supplied to the pumping chamber downstream of the actuator at a rate greater than the difference between the rate of outflow along slug duct section 5 and the then lower rate of volume swept by the actuator. Consequently the actuator valve means 4 remains closed.

Illustration C of FIGURE 1 represents the instant at which the liquid within the chamber ceases to be accelerated and is represented in FIGURE 2 by the peaks $C_1$ and $C_2$ of the curves $b$ and $c$ respectively. The actuator valve means 4 opens at this instant to allow the liquid to travel forwardly through the by-pass passageway 3. Such forward travel continues with reducing velocity of liquid until the points $B_1$ and $B_2$ are again reached in the succeeding cycle.

During this cycle of operations the depulser means 7 and 8 each take in and deliver liquid either "passively," if the means $7a$, $8a$ are elastically deformable means, or "actively," if the means $7a$, $8a$ are piston or like means positively driven from the drive motor.

In either case the depulser means serve two purposes. Firstly, they reduce fluctuations in the rate of intake and delivery of liquid into and from the pump at the ends of the slug ducts 6 and 5, so that ideally the rate of flow upstream of the depulser means 8 and downstream of the depulser means 7 is constant and is represented by lines $b_1$, $c_1$, FIGURE 2 equal to the average or equivalent steady rate of flow for the curves $b$, $c$. Secondly, they partly isolate the slug from the inertial effects of whatever liquid column exists upstream of the depulser means 8 and downstream of the depulser means 7, so that operation of the pumping chamber 1, actuator 2, actuator valve means 4, and elastic body 9 takes place in the environment of a slug of at least approximately determined, as distinct from wholly indeterminate, length. Such length can then be properly related to all the other factors of operation, namely driving motor speed, power output, torque, and suction, and suction and delivery heads against which pumping is required to take place in order to achieve optimum results.

The depulser means 7 takes in liquid from the flow path whenever the rate of flow is above the equivalent steady rate, i.e. for those parts of curves $b$ and $c$ above $b_1$ and $c_1$ respectively, and delivers liquid to the flow path whenever the rate of flow is below the equivalent steady rate, i.e. for those parts of curves $b$ and $c$ below $b_1$ and $c_1$ respectively.

The depulser means 8 concurrently operates in anti-phase, supplying liquid to the flow path for parts of curves $b$ and $c$ above $b_1$ and $c_1$ and taking in liquid for the parts of these curves below $b_1$ and $c_1$ respectively.

In practice the actuator is driven from a motor having a fairly narrow speed range (typically 900 r.p.m. to 1200 r.p.m.) and a limiting or stalling torque. The length of slug is selected to be above a minimum value which would result in the velocity of flow in the slug just falling to zero at the troughs of the curve $c$, when pumping against maximum suction head and maximum pressure head at minimum motor speed, and below a maximum value at which the limiting or stalling torque of the motor would be exceeded. Whilst a specific value of slug length is given herein by way of example it is indicated that in general for pressures up to about 100 lb. per square inch the optimum value of slug length is proportional to the total head of pressure against which pumping has to take place (including suction head at the inlet to the pump, pressure head at the outlet of the pump, and fluid friction through the pump itself), inversely proportional to the difference between maximum and minimum velocity of liquid flow in the slug itself, and inversely proportional to the frequency of operation (speed of rotation of the driving shaft).

The depulser means 7 and 8 do not, and indeed need not, wholly eliminate cyclic variations in the rate of flow and pressure existing flow back of the liquid, but they can be designed to eliminate such flow and pressure variations as are undesirable, for example those which would cause thrashing or lateral movement of a flexible delivery pipe.

The elastic body 9, which is one form of pressure absorbing and restoring means which may be employed, is prestressed so that it starts absorbing energy from the liquid only when the pressure at the point at which the body 9 is situated is above a predetermined level. This level is not critical but satisfactory results are obtained when it has a value of two to two and a half times the value of the maximum pressure head against which the pump is required to deliver.

The body 9 is preferably situated as close to the actuator 2 as possible to reduce the quantity of liquid forming an inertial load on the actuator and hence peak stresses on the actuator and associated parts.

In the alternative form of pump illustrated diagrammatically in FIGURE 3, parts corresponding to those already described with reference to FIGURE 1 are designated by like numerals of reference with suffix $a$ and $b$ in cases where these parts are duplicated.

In this form of pump two actuators $2a$ and $2b$ are driven from a common driving shaft $2c$ through the intermediary of an eccentric element $2d$ and connecting rods as shown.

The actuators $2a$ and $2b$ operated in anti-phase in the sense that when one is moving along its forward stroke in its associated pumping chamber the other is moving reversely and vice versa.

In this case the two pumping chambers $1a$ and $1b$ are connected to respective slug duct sections $5a$, $5b$ which join each other so as to merge into a common delivery pipe $5c$.

The two pumping chambers have a common inlet chamber $1c$ communicating with a common inlet duct.

The manner of operation of this pump is as already described with reference to FIGURES 1 and 2 except that each slug duct section $5a$, $5b$ acts at the delivery end as the depulser means with respect to the other such section $5b$, $5a$ respectively. The average or equivalent steady rate of flow of liquid along the delivery section $5c$ is made up of two contributions, one from the slug duct section $5a$ and one from the slug duct section $5b$, each having an average or equivalent steady rate of flow represented by the line $b_1$ or the line $c_1$ of FIGURE 2 according to the pressure conditions against which the pump is operating.

Thus, for portions of the curve $b$ or the curve $c$ below the line $b_1$ or $c_1$ as the case may be, the contribution from one slug duct section $5a$ or $5b$ has effectively a negative value with respect to the line $b_1$ or $c_1$ (although flow is maintained unidirectionally in the slug duct concerned), this negative value or deficiency is made good in the delivery duct $5c$ by the positive excess represented by the portions of the curve $b$ and $c$ above lines $b_1$ and $c_1$ which concurrently will occur in respect of the other slug duct section $5b$ or $5a$.

Figure 3:
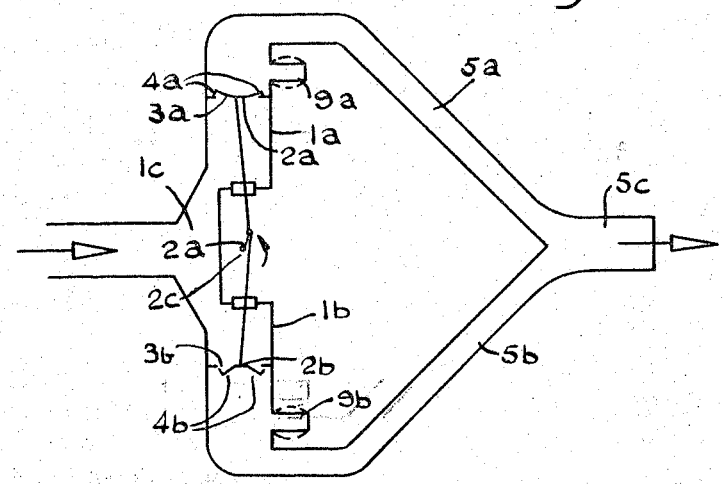
FIGURE 3 is a diagrammatic view similar to FIGURE 1 illustrating an alternative form of pump in accordance with the invention.

At the upstream side of the actuators 2a, 2b a similar set of conditions arises where the common inlet chamber 1c communicates with the pumping chambers 1a and 1b, each such pumping chamber acting as a depulser means with respect to the other, so that, in fact, the overall length of the slug duct is somewhat shortened in the arrangement illustrated in FIGURE 3 in comparison with that existing in FIGURE 1.

Figure 4:
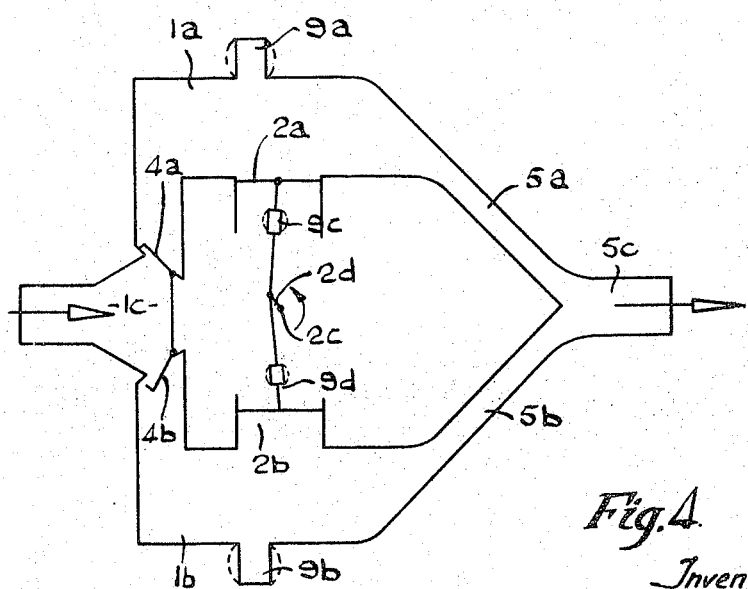
FIGURE 4 is a view similar to FIGURE 3 illustrating a further alternative form of pump in accordance with the invention.

In FIGURE 4, which illustrates a further alternative embodiment also employing two pumping chambers, parts corresponding to those already described in FIGURE 3 are designated by like numerals of reference.

In this arrangement of pump the actuators 2a and 2b are driven from a common driving shaft 2c and eccentric element 2d so as to move in phase opposition, but, instead of moving forwardly and reversely of their associated pumping chambers 1a and 1b, that is to say parallel to the direction of flow, they move laterally with respect to the direction of flow and, in fact, in each case form part of the lateral boundary of the pumping chamber concerned.

The actuators 2a, 2b in this case do not have any openings forming a by-pass passageway through them. Instead the liquid flows past the actuators in a direction longitudinally of the pumping chambers, such flow being controlled by actuator valve means 4a and 4b situated at the inlets pumping chambers.

The pressure absorbing and restoring means 9a and 9b may be of the form already described with reference to FIGURE 1, or alternatively, or in addition, such means may be incorporated in the transmission means, e. g. the connecting rods, which serve to connect the actuators 2a and 2b to the eccentric element 2d. In this case elements such as 9c and 9d, which are elastically deformable and are prestressed so as to undergo displacement only in response to the establishment of a stress exceeding a predetermined value, may be employed. The elements, 9c, 9d, assist in reducing cavitation at the upstream side of the actuator.

As in the case of FIGURE 3, each slug duct section 5a and 5b acts as a depulser means with respect to the other and similar action takes place at the junction between the pumping chambers 1a and 1b with the common inlet chamber 1c.

Figure 5:
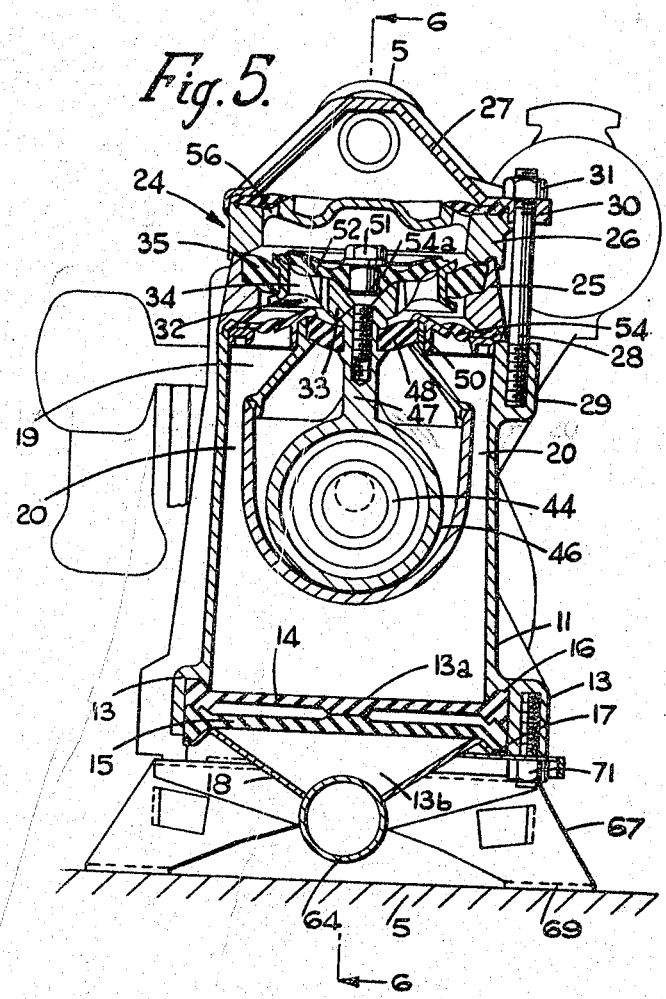
FIGURE 5 is a view in end elevation and in vertical cross section on the line 5—5 of FIGURE 6 showing one practical embodiment of a pump in accordance with the invention, such pump having a single pumping chamber.
Figure 6:
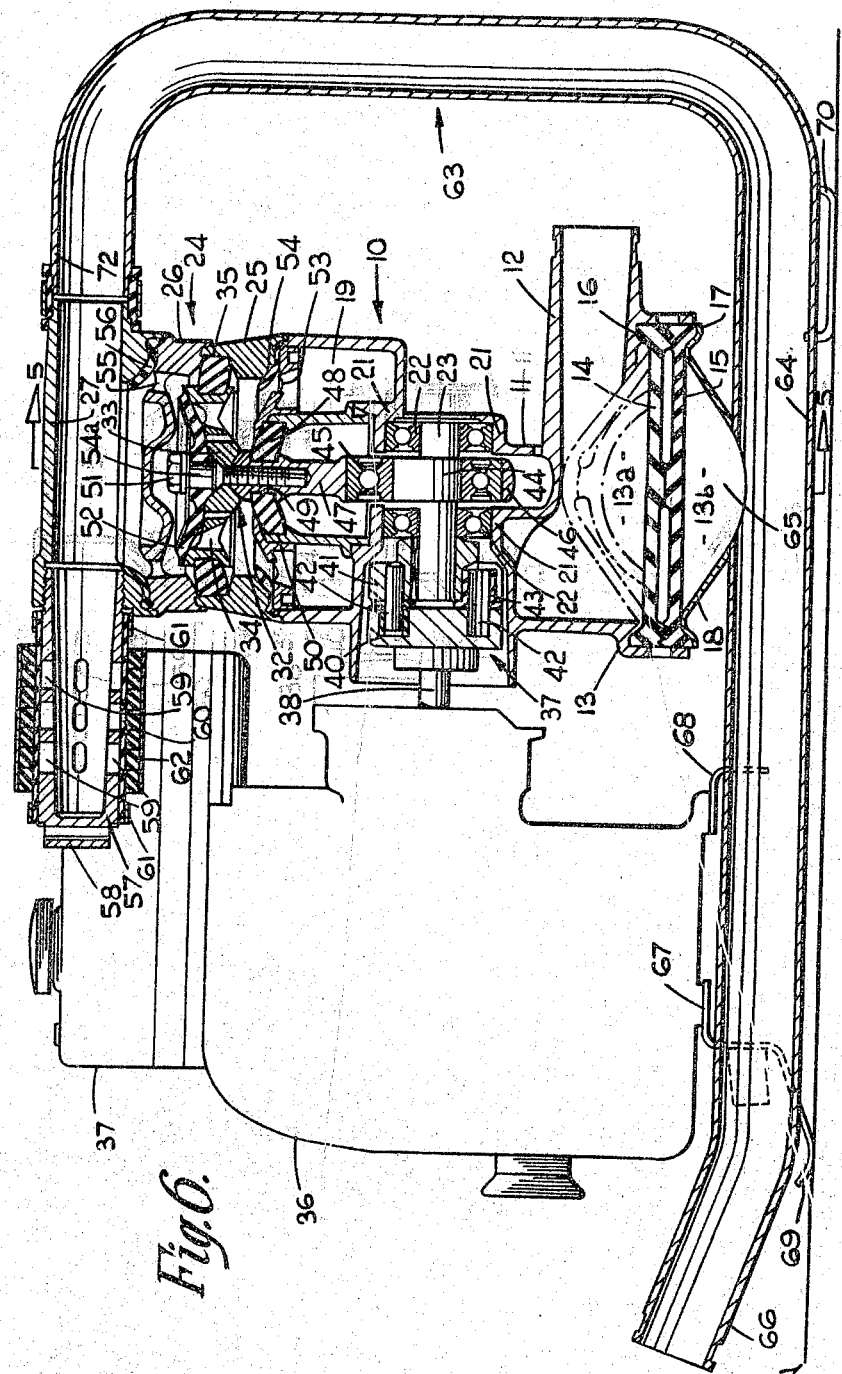
FIGURE 6 is a view in side elevation with certain parts shown in cross section on the line 6—6 of FIGURE 5.
Figure 7:
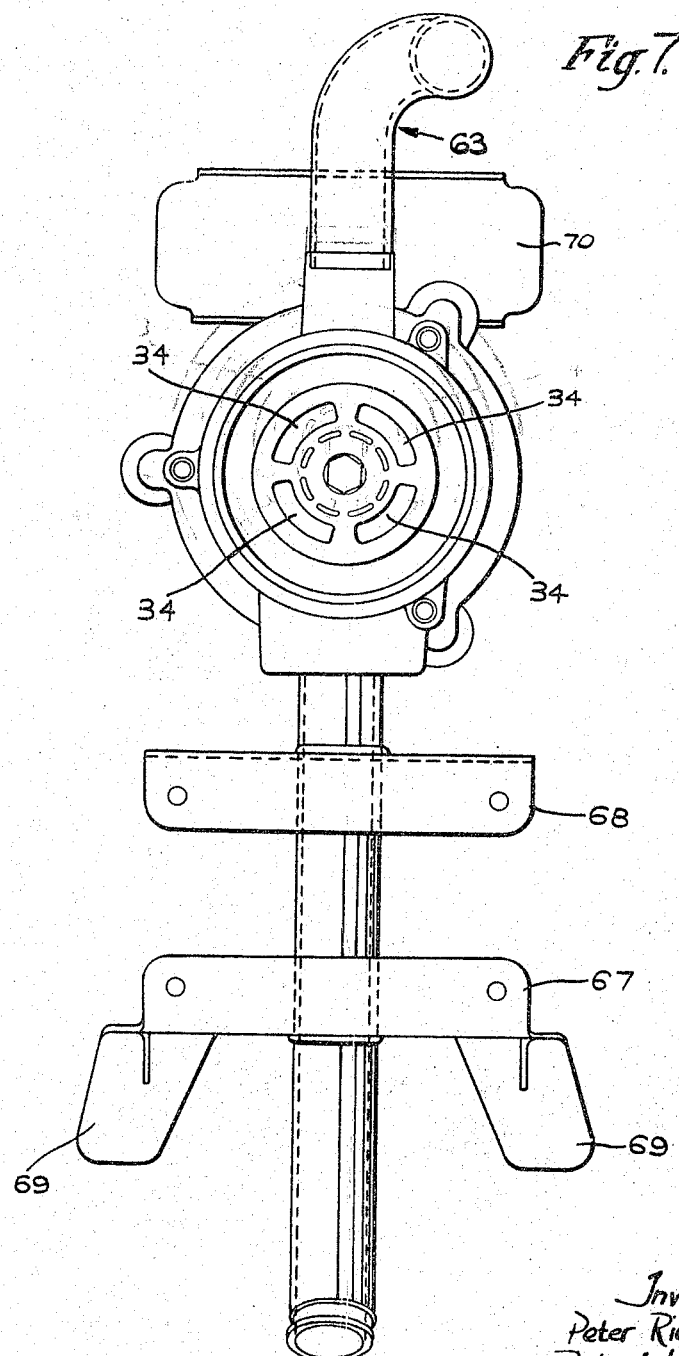
FIGURE 7 is a plan view of the pump illustrated in FIGURES 5 and 6 with certain parts omitted.

Referring now to FIGURES 5 to 7, these illustrate one practical embodiment of pump in accordance with the invention having a single cylinder.

The body of the pump comprises a main unit 10 including an inlet duct section 11 having a spigot 12 to which a flexible inlet pipe of any desired length can be connected. Connected to the inlet duct section 11 at its lower side is a generally cylindrical part which forms the side wall of a subordinate chamber 13 and which contains two diaphragms 14 and 15 of elastic material such as rubber clamped at their peripheries between a downwardly presented annular seating 16 at the lower end of the chamber 13 internally thereof and an upwardly presented seating formed in a rim 17 of a domed sheet metal cover 18.

The parts of the chamber 13 above and below the diaphragm form two depulser chambers 13a, 13b operative effectively at the ends of a slug of liquid extending through the pump as hereinafter described.

The inlet duct section 11 further includes at its upper end an annular inlet chamber 19 which communicates with the spigot 12 by way of passageways 20 (FIGURE 5). The inlet duct section also includes a bearing housing 21 containing a pair of axially spaced bearings 22 in which a driving shaft 23 is journalled.

Above the inlet chamber 19 the main body unit further comprises a pumping chamber 24 which is sub-divided into a lower part 25 and an upper part 26 both of generally cylindrical form externally, and surmounted by an outlet chamber 27. The components of the main unit of the body are held in assembled superposed relation by tie rods 28 disposed at angularly spaced positions around the periphery of the pumping chamber and having their lower ends threaded to engage in internally threaded sockets 29 formed integrally with the inlet chamber 19, whilst their upper threaded ends carry nuts 31 bearing downwardly on lugs 30.

In the pumping chamber is disposed an actuator 32. The actuator comprises a main central portion 33 which is made conveniently as a metal casting of generally circular shape as viewed in plan. Near its peripheral margin the main central portion 33 is formed with a plurality of apertures 34 (FIGURE 6) which collectively constitute a by-pass passageway through the actuator. Between the periphery of the main central portion 33 and the lateral wall of the pumping chamber is disposed a sealing ring 35 of elastic material such as rubber.

The inner periphery of the sealing ring is assembled with the outer periphery of the main central portion 33 of the actuator, as hereinafter described in more detail, in such a manner that relative sliding between these two parts is prevented, and similarly the outer periphery of the sealing ring is assembled with the side wall of the pumping chamber likewise in such a manner as to prevent axial sliding movement. The actuator is moved forwardly, that is to say in an upward direction, and rearwardly, that is to say in a downward direction, by means of a driving motor 36 which may be of any suitable form, for example an internal combustion engine as illustrated with the fuel tank 37 conveniently mounted at the upper side of the motor and offset laterally therefrom, or alternatively in some constructions an electric driving motor could be employed.

Both these forms of driving motor operate most efficiently at a substantially constant speed or within a fairly limited speed range, for example 900 r.p.m. to 1200 r.p.m. in the case of an internal combustion engine. For an electric driving motor which is usually conveniently of the induction motor type the percentage slip from the theoretical synchronous speed does not usually exceed 10%, so that again the speed at which efficient operation can take place can be regarded as either approximately constant or restricted to a narrow range of variation.

Such motor is operatively connected with the crank shaft by way of a coupling 37 providing for some angular misalignment between the output shaft 38 of the motor and the crank shaft. Such coupling may comprise a pair of opposed bushes 40 and 41 one of which is provided with axially projecting pins 42 engaging in openings in the other with the interposition of sleeves 43 of rubber or other elastic material.

The driving shaft 23 has an eccentric element 44 around which extends a bearing 45 contained in an eccentric sheave 46 integral with a connecting rod 47 fixed centrally at its upper end to the central portion 33 of the actuator.

The bearing housing containing the bearings 22, 45 on the eccentric sheave is sealed from the inlet chamber 19. Lateral support and location for the connecting rod 47, additional to that furnished to the connecting rod by virtue of its attachment to the actuator, is provided by a sealing ring 48 engaged at its inner periphery in a groove in the connecting rod, as seen at 49, and at its outer periphery in a groove presented inwardly by the inner wall of the inlet chamber as seen at 50.

The upper end of the connecting rod 47 is secured to the central portion of the actuator by means of a bolt 51 engaging in an internally threaded socket in the upper end of the connecting rod.

In association with the actuator is an actuator valve means 52 in the form of a disc of rubber or other elastic material overlying the upper face of the central portion 33 of the actuator and covering the apertures 34 therein. The actuator valve means is held in position by reception of its inner periphery in the groove of a bush 54a provided on the bolt 51 at its upper end.

At the inlet 53 to the pumping chamber is disposed a non-return inlet valve 54 comprising an annular member of rubber or other elastic material clamped at its outer margin between the upper ends of the inlet chamber and the lower end of the lower part 25 of the pumping chamber.

At the outlet 55 of the pumping chamber is disposed a non-return outlet valve 56 also comprising an annular member of rubber or other elastic material at either peripheral margin of which is clamped between the upper end of the upper component 26 of the pumping chamber and the lower end of the outlet chamber 27. Whilst these valves 54 and 56 would serve to prevent any reversed flow of liquid through the pumping chamber, it will be understood that in normal operation of the pump such flow does not in any case occur, and hence these valves remain in a permanently open position in which they are shown in FIGURE 6, such valves, however, being biased by virtue of the inate elasticity of the material from which they are formed towards a closed position, as seen in FIGURE 5.

The outlet chamber 27 has connected to it, at one side, an expansion chamber in the form of a radially projecting sleeve 57 having a plug 58 at its outer end, and is formed with a plurality of holes 59 intermediate its ends.

The flow of liquid through the holes 59 is controlled by an outer body of elastic material in the form of a composite sleeve. This includes an inner sleeve member 60 extending over the whole length of the metal sleeve 57 in which the holes are formed and clamped to the latter at its ends by means of clips 61 so as to form a fluid tight joint thereat.

The outer component of the composite sleeve is constituted by a plurality of rings 62 of rubber or other elastic material which are pre-stressed in tension by virtue of the fact that their unstressed internal diameter is less than that afforded externally by the sleeve 60. The metal sleeve 57 acts as a positive stop means with respect to the rings 62 and sleeve 60 so that these are retained in the position shown whilst the rings 62 are in a state of stress.

Consequently until the pressure of liquid in the expansion chamber exceeds a predetermined value producing an opposing stress in the rings 62 exceeding the value of the prestress, the rings 62 and the sleeve 60 are not expanded and hence liquid cannot flow out of the holes 59 so that the interior volume afforded by the expansion chamber remains constant. The value at which the effective volume afforded by the expansion chamber increases is determined by the number, dimensions, and material of the rings 62. Consequently this value can readily be varied by replacing the rings 62 by ones of different dimensions, or material, or by utilising a different number of rings 62.

At the opposite side of the outlet chamber 27 this has a pipe 63 connected to it, herein referred to as a slug pipe. Such pipe approximates to U-shape as viewed in side elevation in FIGURE 6. Its lower branch 64 is formed with an opening 65 in register with a corresponding opening formed in the cover member 18 so that such pipe communicates with the lower depulser chamber 13b.

The free end 66 of the pipe can be connected to a flexible delivery pipe by means of a suitable clip.

Further, the slug pipe 63 is utilised as part of a frame structure of the pump as a whole and for this purpose carries transverse sheet metal bearer plates 67 and 68 (FIGURES 6 and 7) upon which the driving motor 36 is mounted. One of these plates 67 is formed at its outer extremities with downwardly projecting foot portions 69 to provide, in combination with the further transversely extending plate 70, three-point support on the ground or other supporting surface for the pump as a whole.

The members 67 and 68 and 70 may be welded or otherwise secured to the lower branch 64 of the slug pipe 63.

The diaphragms 14 and 15 are formed of structurally separate pieces of elastic material such as rubber, their peripheries being clamped between the seatings already referred to by tie bolts such as those indicated at 71 (FIGURE 5). The diaphragms may merely be in contact with each other or may be joined, or may be combined into a single diaphragm common to the two depulser chambers.

The general manner of operation of the pump is as already described with reference to FIGURES 1 and 2. However, the following further description supplements that already given with respect to certain features disclosed in the practical embodiment illustrated in FIGURES 5 to 7.

The slug duct is that part of the structure containing the column of liquid extending upwardly from the upper depulser chamber 13a of the part 13, through the inlet chamber, through the pumping chamber, outlet chamber, and along the slug pipe as far as the opening 65 which communicates with the lower depulser chamber 13b.

When operating against heads in the predetermined range for which the pump is designed, liquid in this slug is caused to move continuously in a forward direction as a result of forward and reverse movement of the actuator and automatic opening and closing of the actuator valve means 52 whilst the non-return inlet valve 54 and non-return outlet valve 56 remain permanently open.

The sleeve 60 and ring 62 operate as the pressure absorbing and restoring means, already referred to with reference to FIGURES 1 and 2, to reduce peak accelerations of liquid in the slug and hence excess pressure in the upper part of the pumping chamber, outlet chamber and slug pipe.

The flow of liquid in the slug along the upper horizontal branch 72 of the slug pipe 63 and in the same direction in the outlet chamber 27, is in a direction which is opposite to that in which flow takes place in that part of the slug contained in the lower branch 64 of the slug pipe, and tends to minimise vibrations of the pump as a whole in a horizontal plane and hence to prevent unwanted drifting or displacement of the pump on the ground or supporting surface.

In the event of an excess pressure arising in the slug pipe, for example as a result of blockage of the outlet thereof, pressure rise in the lower depulser chamber at the downstream end of the slug causes the two diaphragms 14 and 15 to be elastically deformed upwardly to the position indicated in chain lines in FIGURE 6, thus closing the inlet at spigot 12 and preventing further intake of liquid from the source.

As an additional safeguard the sleeve 60, ring 62 would expand to relieve internal pressure in the pump and could be arranged if desired to allow liquid to escape by employing a clip 61 which is itself capable of expansion at a predetermined value of pressure to permit of separation of the sleeve 60 in a direction radially from the metal sleeve 57 under these conditions.

Whilst it is contemplated that the pump may be made in various sizes according to the rate of flow of liquid which it is to deliver, the following data represents a typical design:

| | |
|---|---|
| Speed of driving shaft | 900 to 1,200 r.p.m. |
| Actuator Stroke | 0.5 inches. |
| Diameter of slug pipe | 1.62 inches. |
| Overall length of slug | 30 inches. |
| Stiffness of diaphragms 14, 15 collectively (displacement as a function of pressure in depulser chamber). | 0.5 per square inch, per cubic inch change of volume of chamber. |
| Rate of delivery of liquid from pump (approximate values corresponding to the range of heads against which pumping has to take place). | 4,000 gallons per hour at zero external head. 2,200 gallons per hour against 60 ft. external head (suction and pressure head total). |
| Actuator displacement (volume swept in unit time at mean speed of driving shaft). | 1,700 gallons per hour. |

Figure 8:
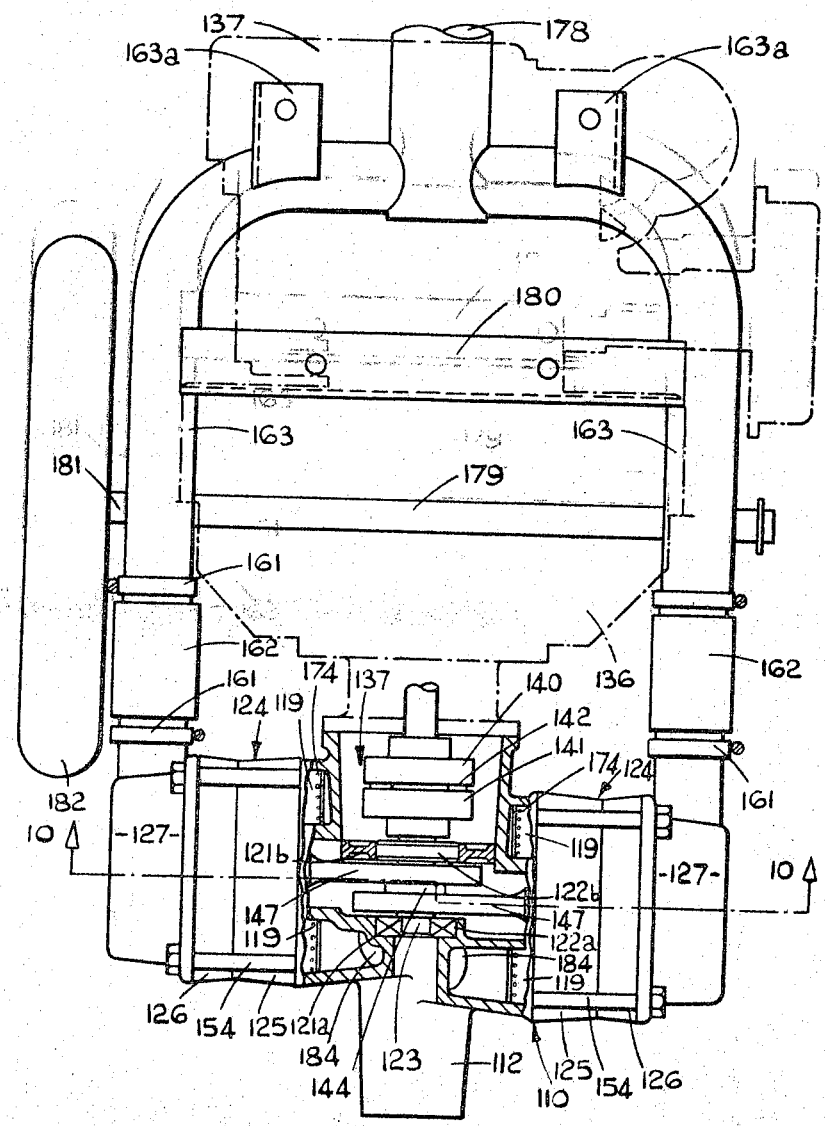
FIGURES 8 and 9 are a plan view partly in cross section and a side elevation respectively of an alternative practical form of pump in accordance with the invention, such pump having more than one pumping chamber.
Figure 9:
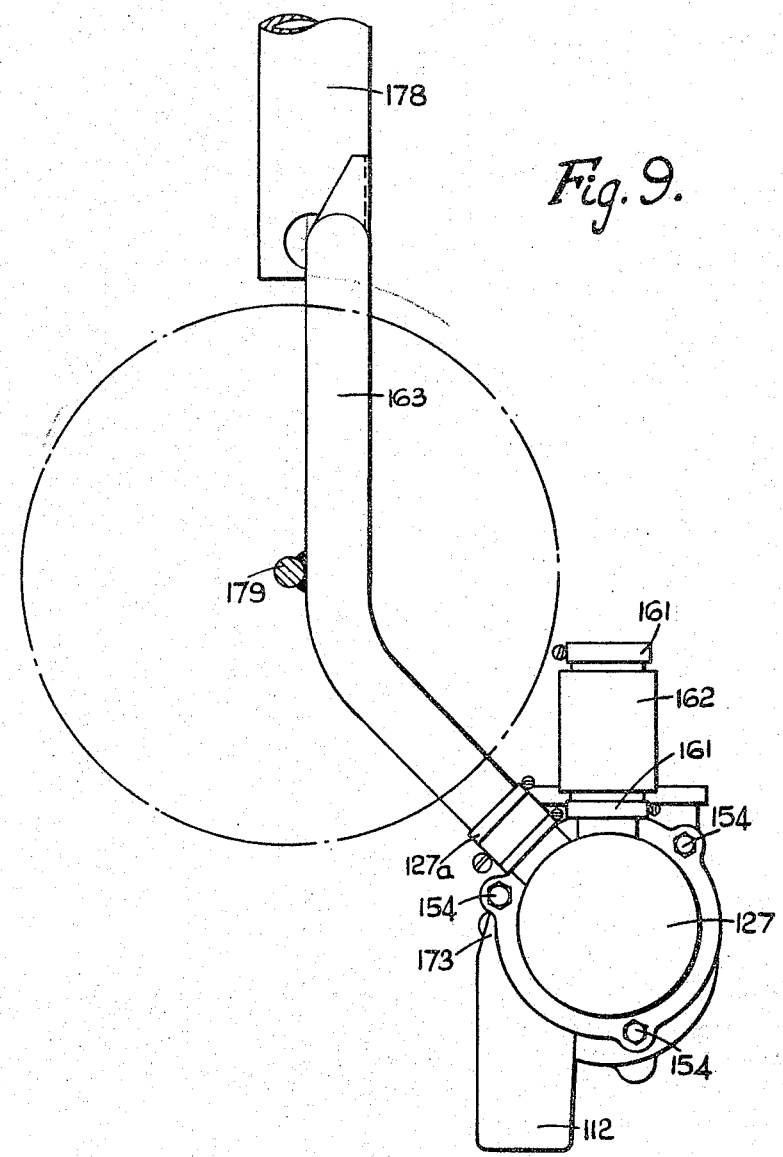
Figure 10:
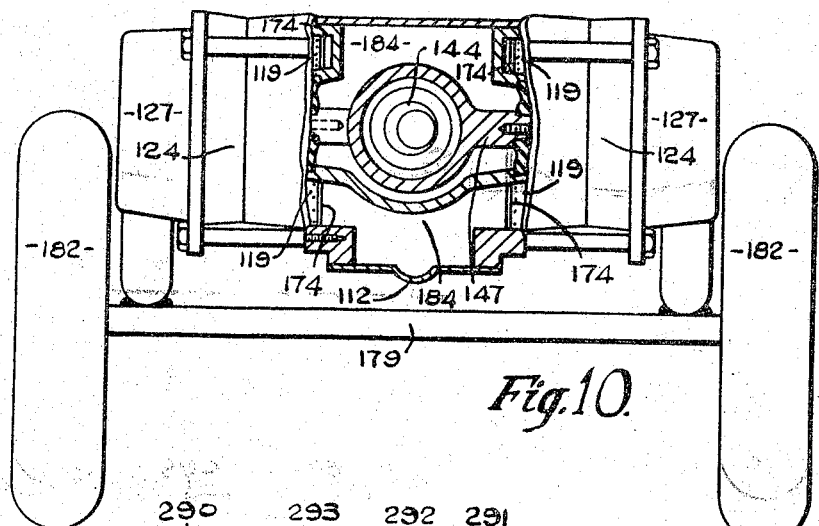
FIGURE 10 is a fragmentary view in end elevation and partly in cross section on the line 10—10 of FIGURE 9.

The construction of pump illustrated in FIGURES 8 to 10 is a practical embodiment of the pump illustrated diagrammatically in FIGURE 3. Parts corresponding to those already described with reference to FIGURES 5 to 7 are designated by like numerals of reference with the prefix 1 so as to be in the series 110 to 200.

So far as corresponding component parts are concerned the description hereinbefore set forth is to be deemed to be applicable to the construction illustrated in FIGURES 8 to 10 subject to the various modifications in the construction and manner of operation as now described.

Instead of employing a single pumping chamber the pump includes two pumping chambers 124, certain parts being common thereto, namely the inner parts of the pumping chambers and the bearing housings 121a, 121b for accommodating the bearings 122a, 122b for driving shaft 123, eccentric element 144 and bearings 122 and 145.

An inlet pipe 112 disposed beneath the two pumping chambers is common to these and is connected integrally with a channel-shaped inlet duct portion 173 separated from inlet chambers 119 by grids 174 so as to prevent passage of solid particles above a predetermined size into the inlet and pumping chambers.

The pumping chambers 124 each contain actuators and actuator valve means as already described with reference to FIGURES 5 to 7 and have inlets and outlets controlled by non-return inlet and outlet valves. The actuators are connected by respective connecting rods 147 to the eccentric element 144 common to both.

The actuators of the two pumping chambers are thus moved in anti-phase relation.

The output chambers 127 are connected by coupling sleeves 127a to respective slug pipes 163 to a common rigid delivery pipe 178, to the extremity of which a flexible delivery pipe of any kind may be connected. The pipe 178 is of larger diameter than the slug pipes, for example three inches, whilst the slug pipes may be of two inch diameter.

Connected to the outlet chambers above their associated slug pipes are expansion chambers. These comprise apertured sleeves embraced by composite sleeves 162 of rubber or other resilient material, the outer components of which consist of a series of rubber rings, as already described with reference to FIGURES 5 to 7.

The slug pipes 163 in combination with cross members 179, 180 form a frame serving to carry the driving motor 136 and fuel tank 137 (shown for clarity only in outline by chain lines in FIGURE 8). The forward ends of the slug pipes carry mounting pads 163a for this purpose. One of the cross members, 179, is provided at opposite sides with axle members 181 on which respective road wheels 182 are mounted. At the forward end of the frame a tow bar or handle may be attached to the delivery pipe 178.

The depulser chambers and associated depulser diaphrams, situated at the upstream and downstream extremities of the slug in the construction already described with reference to FIGURES 5 to 7, and consisting in one case of part of the cylindrical formation 13 and the diaphragm 14, and consisting in the other case of the cover member 18 and the diaphragm 15, are omitted in the present construction.

In operation liquid enters the inlet pipe 112 and flows through the channel section duct 173 and through the grating or apertured plates into inlet chamber portions 119. Unidirectional flow through each pumping chamber and actuator takes place as already described for the construction of FIGURES 5 to 7.

In the delivery pipe 178 liquid is delivered from the two branches constituted by the slug pipes 163.

Each slug pipe acts as a depulser means for the other slug pipe, as already described with reference to FIGURE 3, and similar depulsing action takes place at the inlet chamber 184 where the two chambers 119 communicate with each other.

In an alternative construction of pumping chamber, actuator and outlet chamber illustrated in FIGURE 11, parts corresponding to those already described with reference to FIGURES 5 to 7 or 8 to 10 are designated by like numerals of reference with the prefix 2 so as to lie in the range 210 to 300.

Figure 11:
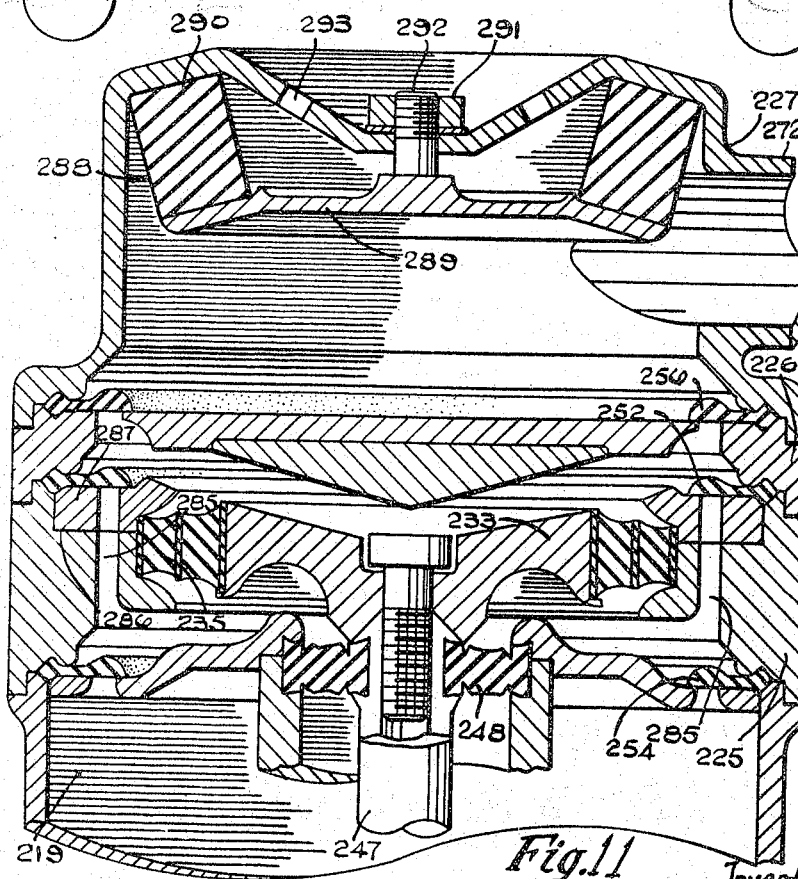
FIGURE 11 is a fragmentary view in vertical cross section through a diametral plane of the pumping chamber, showing a modified form of pumping chamber which can be utilised in either of the constructions illustrated in FIGURES 5 to 7 and 8 to 10 respectively.

So far as corresponding component parts are concerned the description hereinbefore set forth is to be deemed to be applicable to the construction illustrated in FIGURE 11, subject to the various modifications in the construction and manner of operation as now described.

In this construction the central portion 233 of the actuator is not formed with openings such as the openings shown in FIGURE 6. The by-pass passageway is constituted by a plurality of channels 285 which extend effectively through the lateral wall of the lower part 225 of the pumping chamber from the upstream side of the actuator to the downstream side thereof.

For this purpose the lower part 225 of the pumping chamber is formed at its upper end with an internal rebate or seating 286 in which is received the upper radially projecting flange 287 of an annular component of approximately L section, the axially extending flange of which is spaced from the inner surface of the lower part 225 of the pumping chamber. The lower part of each channel 285 is thus of continuous annular form whilst the upper part, which extends through the flange 287 is constituted by an angularly spaced series of arcuate slots or holes.

The outlet chamber 227, instead of being provided with an expansion chamber such as is shown in FIGURE 6, is provided internally with pressure absorbing and restoring means in the form of an elastic body indicated generally at 288.

This comprises a metal plate 289 spaced at its upper side from the upper wall of the outlet chamber by an annular member 290 of rubber or other elastic material which may be bonded to both the plate 289 and the downwardly presented surface of the upper wall of the pumping chamber, or may be merely compressed against these opposed surfaces by means of a nut 291 disposed on a threaded stud 292 protruding through an opening in the said upper wall. The upper wall is vented by means of openings 293.

The sealing rings 235 and 248 provided in this construction also differ in form from that shown in FIGURE 6 and described with reference thereto as more fully hereinafter explained.

The modification illustrated in FIGURE 11 is especially suitable for use in a pump which has to operate against high back pressures and/or where large quantities of solid particles or abrasives are present.

Referring now in more detail to the construction of the actuator as seen in FIGURE 13 the main central portion 32 thereof is of a diameter such as to provide a comparatively small clearance space 32a between its outer periphery and the inner surface of the side wall of the pumping chamber afforded by the lower and upper parts 25 and 26 thereof. It will be evident from FIGURES 5 and 6 that the radial dimension of the central portion of the actuator measured from its center to the outermost part of its periphery is a plurality of times greater than the minimum radial dimension of the clearance space 32a measured between said outermost part and the intermost part of the side wall, that is immediately above and below the grooves in each case.

The clearance space 32a is filled by the sealing ring 35 which is maintained in axially fixed, i.e. non-sliding contact with the periphery of the main central portion 32 and outer side wall of the pumping chamber.

This is accomplished in the form of sealing rings and construction of actuator and pumping chamber illustrated in FIGURES 12 to 14 by forming the periphery of the main central portion of the actuator 32 with a groove 32b in which the inner margin of the sealing ring 35 is received.

Similarly the outer margin of the sealing ring 35 is maintained in non-sliding relation with the side wall of the pumping chamber by shaping the upper and lower parts 26 and 25 thereof collectively to form a groove 25a.

In each case the bottom of the groove 32b and 25a is equal to or slightly smaller in width (measured axially of the actuator) than the corresponding width of the inner peripheral face 35a and outer peripheral face 35b of the unstressed sealing ring as seen in FIGURE 12 or than the corresponding widths of these faces when the ring is under radial compression, thus there is positive retention against sliding between each of these faces and the actuator or pumping chamber as the case may be by abutment between the sealing ring and the lateral boundary faces of the groove concerned. The inner and outer margins of the sealing ring form attachment portions which are supported axially by the grooves while the intervening medial portion of the ring which extends between the mouths of the grooves is not axially supported.

The lateral boundary faces 32c and 32d of the groove 32b are divergent from each other in a direction from the bottom of the groove towards its mouth and likewise the lateral boundary faces 25b and 25c of the groove 25a are similarly divergent.

The radial distance between the bottoms of the two grooves is such that the sealing ring is subjected to radial compression. Varying degrees of radial compression may be utilised according to the magnitude of the axial displacement which the actuator is required to undergo and the axial pressure which the sealing ring has to withstand from the fluid undergoing pumping. It is believed that in most cases radial compression reducing the radial width of the sealing ring by 10 to 20 percent, a typical value being 15 percent, will be found satisfactory.

It is moreover preferred that the axial dimension of the ring should be somewhat greater at its inner peripheral face 35a than is the case at its outer peripheral face 35b so as to provide for greater uniformity of stressing throughout the material of the sealing ring. It will further be noted that the axial dimension of the medial portion of the sealing ring at the center of the clearance space 32a is greater than the minimum radial dimension of the clearance space already referred to.

The radial compression results in the production of axially presented faces 35c and 35d on the sealing ring which are of curved convex form as seen in cross section in FIGURES 13 and 14. It will be noted that the axial dimension of the ring in its unstressed state relatively to the radial dimension of the medial portion of the ring unsupported by the grooves is sufficiently great to avoid any buckling so that upon radial compression there is fold-free axial expansion at both axially directed faces.

Advantageously the lateral boundary faces 25b, 25c and 32c, 32d are also made of curved convex form.

It is beneficial for at least one of each pair of opposed faces presented by the lateral boundaries of the groove and the opposed margin of the sealing ring to be of this curved convex form in order to minimise relative sliding movement upon contact of the faces such as is seen to occur between the faces 35c and 32d at the upper side of the sealing ring and the faces 35d and 25 at the lower side of the sealing ring when the actuator 32 has been moved to the lower end of its stroke resulting in deflection of the median plane 35e of the sealing ring with respect to a reference plane 35f through an angle of typically 17°. For a deflection angle between said median plane and said reference plane, herein referred to as the "basic" deflection angle, the adoption of divergent and preferably convexly curved faces in respect of both the lateral boundary faces of the grooves and the axial faces of the sealing ring minimises the extent to which the deflection of elemental cubes exceeds the basic deflection. Each such elemental cube is bounded by faces generally parallel to the peripheral, and the upper and lower faces of the ring and by a pair of faces generally parallel to the section plane of the ring as seen in FIGURES 12 to 14. The arrangement now described and illustrated in FIGURES 13 and 14 limits the deflection of the elemental cubes to a value which does not exceed twice that of the basic deflection angle and hence materially contributes to attainment of a satisfactory service life for the sealing ring The stress involved is predominantly a shear stress.

The sealing ring may be made of either natural or synthetic rubber or may be made of any other synthetic resin having similar elastic properties.

Figure 15:
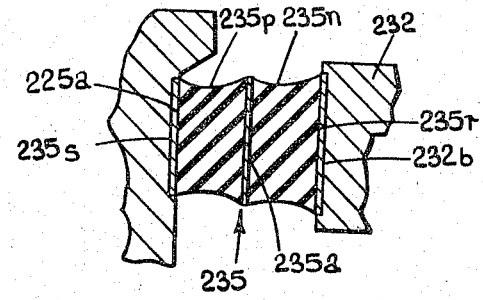

In the alternative construction illustrated in FIGURE 15 parts corresponding to those already described are designated by like numerals of reference with the prefix 2. In this case the sealing ring 235 comprises two annular sections 235n and 235p each having a radial width which is sufficiently small relatively to its axial thickness to ensure that the stress established as a result of axial movement of the actuator will be predominantly a shear stress. As illustrated the ratio of radial dimensions, to the axial dimension is approximately 1:2. The ring is also subjected to radial compression.

The two ring sections are each bonded to an intervening metal ring 235a. Whilst the sections 235n and 235p could, if desired, be integrally connected with attachment portions through neck portions as already described, a preferred arrangement is one in which further metal rings 235r and 235s are provided at the inner and outer faces of the rings, these metal rings being bonded to the respective ring sections 235n and 235p. The grooves 232b and 225a are of dimensions to receive the metal rings 235r and 235s as an interference fit.

Alternatively the metal rings may be secured in position by attachment elements formed on them, such for example as screw threaded studs extending through bores in the main central portion of the actuator and in the side wall of the pumping chamber, such bores being closed at their outer ends by sealing washers and nuts carried by the studs.

Figure 16:
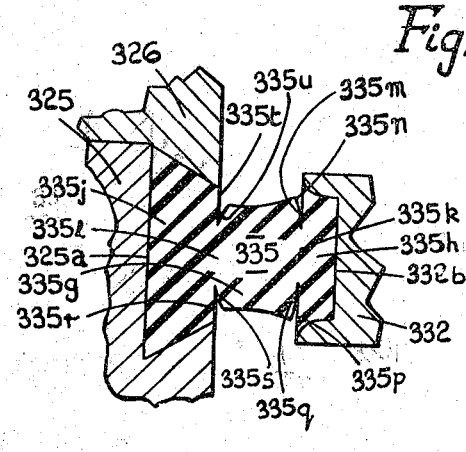
FIGURES 15 and 16 are cross-sectional views of alternative forms of seal which may be so employed.

In the form of sealing ring illustrated in FIGURE 16 parts corresponding to those already described are designated by like numerals of reference with the prefix 3. The sealing ring 335 has a main central portion 335g and two attachment portions 335h and 335j received respectively in grooves 332b and 325a of the actuator and side wall of the pumping chamber.

These attachment portions are of shape which is complementary to those presented by these two grooves and of the same or slightly larger dimensions so that each attachment portion is constrained to take up the shape of the groove when assembled between the side wall of the pumping chamber and the actuator in a state of radial compression.

The central portion of the ring is integrally connected with the attachment portions by neck portions 335k and 335l which are of reduced thickness measured axially of the pumping chamber in comparison with either the central portion or the attachment portions.

In axial or approximately axial alignment with the neck portions the ring affords grooves bounded by opposed lateral faces of which there are thus four pairs indicated respectively at 335m, 335n, 335p, 335q, 335r, 335s, 335t, 335u.

The axial thickness of the neck portions 335l, 335k is such that these are stressed predominantly in shear as a result of relative movement in the axial direction between the actuator and the lateral wall of the pumping chamber.

Although the sealing ring is shown in FIGURE 16 for clarity with opposed pairs of faces 335m to 335u in spaced relation for each pair, it will be understood that in practice these faces are brought into contact with each other by the radial compression of the sealing ring. At least one face of each pair is preferably of curved convex form so that when brought into contact with its opposed companion faces a rolling relation will be established between the central portion 335g of the ring and the attachment portions 335h and 335j.

The thickness of the central portion is such that it will withstand bending stress due to difference to pressure above and below the sealing ring.

The groove 325a is of undercut form in cross section, and both grooves may be so formed if desired. If desired the radial dimensions of the associated attachment portion 335j in the unstressed condition may be greater than that of the groove so that such attachment portion is subject to pre-stress by way of radial compression when installed in this groove. Retention of the ring may be augmented in respect of either attachment portion by bonding the ring to the metal of which the actuator and the lateral wall of the pumping chamber is made.

It will be understood that although the sealing ring illustrated in FIGURES 12 to 14 and 16 is retained satisfactorily in the grooves of the actuator and lateral wall of the pumping chamber against displacement therefrom under pressure of the fluid to be pumped and is assisted in being so retained by the radial compression of the sealing ring, it could if desired be bonded to the bottom of either of the grooves.

The sealing rings above described may be employed between the actuator and lateral wall of the pumping chamber and between the connecting rod 47 and periphery of the aperture at the lower end of the pumping chamber.

In the latter case the sealing ring provides some degree of lateral support to the connecting rod. Both sealing rings in combination are able to resist any lateral thrust on the actuator and transmission means during operation of the pump.

What we claim then is:

1. A pump for pumping liquid comprising:
    (a) a pumping chamber;
    (b) an actuator mounted in said chamber for movement forwardly and reversely relatively to said chamber and an actuator valve means associated with said chamber for producing flow of liquid into and out of said chamber;
    (c) driving means connected to said actuator for moving said actuator forwardly and reversely with respect to said chamber;
    (d) a slug duct communicating with the said chamber and extending at least downstream thereof;
    (e) depulser means communicating with said slug duct at a position downstream of said chamber; and
    (f) a pressure absorbing and restoring means communicating with said chamber for reducing the peak value of stress which would otherwise be established in said driving means, said actuator, and said chamber;
    (g) said slug duct having, over a substantial part of its length, a cross sectional area less than that of said chamber measured in each case transversely of the direction of liquid flow, and having a length sufficient to produce forward flow of a volume of liquid per unit time through said slug duct higher than that volume swept by the actuator in the same time in its forward movements.

2. A pump for pumping liquid comprising:
    (a) a pumping chamber;
    (b) an actuator mounted in said chamber for movement forwardly and reversely relatively to said chamber and an actuator valve means associated with said chamber for producing flow of liquid into and out of said chamber;
    (c) driving means connected to said actuator for so moving said actuator relatively to said chamber;
    (d) a slug duct communicating with the said chamber and extending at least downstream thereof;
    (e) depulser means communicating with said slug duct at a position downstream of said chamber; and
    (f) a pressure absorbing and restoring means communicating with said chamber for reducing the peak value of stress which would otherwise be established in said driving means, said actuator, and said chamber;
    (g) said slug duct having:
        (i) over a substantial part of its length, a cross sectional area less than that of said chamber measured in each case in the direction of flow of liquid,
        (ii) a volume at least a plurality of times greater than the volume swept by said actuator in each forward stroke thereof,
        (iii) a length downstream of said actuator a plurality of times greater than any length upstream thereof.

3. A pump as claimed in claim 1 for pumping liquid, further comprising:
    (a) at least one additional pumping chamber;
    (b) at least one additional actuator mounted in said additional chamber for movement forwardly and reversely therein and at least one additional actuator valve means each disposed in a respective one of said additional chambers for producing flow of liquid into and out of such chamber;
    (c) at least one additional slug duct communicating with said additional pumping chamber and extending at least downstream thereof;
    (d) an outlet duct communicating with said slug ducts downstream of their respective chambers;
    (e) said at least one additional actuator being connected to said driving means to move in such coordinated relation to said first-defined actuator that liquid flow contributions from said slug ducts combine in said outlet duct to provide continuous unidirectional flow of liquid therein; and
    (f) at least one addition pressure absorbing and restoring means communicating with said additional chamber and operatively associated therewith, each of said pressure absorbing and restoring means including preload means for defining a minimum value of pressure at which each said pressure absorbing and restoring means becomes operative.

4. A pump as claimed in claim 1 wherein said pressure absorbing and restoring means comprises:
    (a) an elastic body;
    (b) stop means;
    (c) means for prestressing said body to cause it to deform and exert pressure against said stop means; and
    (d) means associated with said body for subjecting it to stress to move it away from said stop means upon attainment of a predetermined pressure in said liquid in said pumping chamber.

5. A pump as claimed in claim 4 wherein:
    (a) said stop means comprises an expansion chamber having at least one aperture; and
    (b) said body comprises a piece of tensionally stressed elastic material overlying said aperture and engaging a surface portion of said chamber adjacent to said aperture.

6. A pump as claimed in claim 5 wherein said piece of elastic material comprises at least one sleeve embracing said expansion chamber, said pump further comprising means associated with said sleeve for preventing leakage of liquid from an interspace between said expansion chamber and said sleeve upon expansion of the latter in response to establishment of liquid pressure in said expansion chamber above said predetermined value.

7. A pump as claimed in claim 6 wherein said sleeve is of composite form and includes an inner sleeve member proper and a plurality of rings of elastic material embracing said sleeve member proper exteriorly.

8. A pump as claimed in claim 1 wherein said pressure absorbing and restoring means comprises an elastic body, stop means, means for prestressing said body to cause same to deform and exert pressure against said stop means; and means defining a path containing liquid and extending between said body and said pumping chamber and along which liquid pressure is transmissible to move said body against said prestress away from said stop means, said pump further comprising non-return valve means disposed in said path between said actuator and said elastic body, and biasing means provided for urging said non-return valve means to a closed position to prevent reversed flow of liquid therethrough, said biasing means being weaker than the pressure exerted on said non-return valve means throughout forward and reverse movement of said actuator due to the inertial flow of liquid in said slug duct whereby said non-return valve means remains permanently open once liquid delivery has started.

9. A pump as claimed in claim 1 wherein said slug duct also extends upstream from said pumping chamber, said pump further comprising further depulser means provided in communication with said slug duct upstream of said pumping chamber.

10. A pump as claimed in claim 9 wherein:
(a) each of said depulser means comprises a subordinate chamber communicating with said slug duct;
(b) each said subordinate chamber is defined at least in part by an elastic wall portion alternatively stressed and relieved in accordance with the pressure of liquid in said slug duct where this communicates with said chamber; and
(c) said elastic wall portions are operatively connected to each other to undergo displacements in directions such that while one of said subordinate chambers takes in liquid from said slug duct the other of said subordinate chambers delivers liquid to said slug duct.

11. A pump as claimed in claim 1 further comprising overload means for preventing inflow of liquid to said slug duct at its inlet end in response to a liquid pressure exceeding a predetermined value at the outlet end of said slug duct.

12. A pump as claimed in claim 1 wherein:
(a) said depulser means communicating with said slug duct at a position downstream of said pumping chamber comprises a subordinate chamber communicating with said slug duct and defined at least in part by an elastic wall portion;
(b) said pump further comprises a further depulser means communicating with said slug duct upstream of said pumping chamber and comprising a subordinate chamber communicating with said slug duct and defined at least in part by an elastic wall portion;
(c) said elastic wall portions are operatively connected with each other to undergo respective displacements in directions such that while one of said subordinate chambers takes in liquid from said slug duct the other said subordinate chambers delivers liquid to said slug duct; and
(d) said elastic wall portion of said depulser means communicating with said slug duct upstream of said pumping chamber is displaceable into a position preventing inflow of liquid into said slug duct at its inlet end in response to the establishment of liquid pressure in said subordinate chamber of said depulser means communicating with said slug duct downstream of said pumping chamber so as thereby to operate as an overload means.

13. In a pump for pumping liquid having an inlet and an outlet connected to a pumping chamber, an actuator mounted in, and movable back and forth relatively to, said chamber in a direction such as to have at least a component of axial movement parallel to a side wall of said pumping chamber, driving means connected for so moving said actuator, and valve means disposed for establishing flow of liquid from said inlet to said outlet in response to movement of said actuator, the improvement wherein said actuator comprises:

(a) a relatively rigid central portion connected to said driving means and having a peripheral face spaced radially inwardly of the side wall of said pumping chamber to define a clearance space therefrom;
(b) a sealing ring of resiliently deformable material having at least a medial portion disposed in said clearance space, said medial portion having a radial dimension in its unstressed state greater than the radial dimension of said clearance space, said sealing ring being thereby maintained in a state of radial compression between said central portion and said side wall, and said medial portion having an axial dimension in its unstressed state which is sufficiently great relatively to its radial dimension to provide fold-free axial expansion of said ring in said clearance space when under radial compression, said medial portion having an axially presented face which is in communication with the region of said chamber through which liquid under pressure passes and which, when said ring is in a state of radial compression, is of curved convex form as viewed in a cross-sectional plane containing the axis of said actuator; and
(c) means associated with said sealing ring for retaining said sealing ring in non-sliding engagement with said central portion and with said side wall in the direction of movement of said actuator relatively to said side wall.

14. An arrangement as defined in claim 13 wherein:
(a) said peripheral face of said central portion of said actuator and said side wall of said pumping chamber have respective grooves;
(b) said sealing ring has an inner margin received in said groove of said central portion and an outer margin received in said groove of said side wall; and
(c) said grooves are dimensioned to retain said sealing ring margins against sliding relative to said central portion and relative to said side wall during said relative movement of said central portion.

15. An arrangement as defined in claim 14 wherein said grooves have axial boundary faces opposed to axially presented faces of said ring, and said axial boundary faces are respectively divergent from said axially presented faces of said ring in a direction towards the mouth of each groove from the bottom thereof.

16. An arrangement as defined in claim 15 wherein one of said faces of each pair of opposed faces is of curved convex form as viewed in a cross sectional plane passing through the axis of said actuator.

17. An arrangement as defined in claim 13 wherein:
(a) said medial portion of said ring is integrally connected with inner and outer attachment portions of said ring by neck portions of reduced thickness;
(b) opposed lateral surfaces of said medial portion and said attachment portions form lateral boundaries of grooves in axial alignment with said neck portions; and
(c) said lateral boundaries are shaped for experiencing mutual rolling contact with each other during said movement of said central portion of said actuator.

18. An arrangement as defined in claim 13 wherein said radial dimensions of said medial portion of said sealing ring in its unstressed state is between 10% and 20% greater than the radial dimension of said clearance space in which such portion is disposed.

19. An arrangement as defined in claim 13 wherein said sealing ring is bonded to said central portion of said actuator.

20. An arrangement as defined in claim 19 wherein said sealing ring is bonded to said side wall of said pumping chamber.

21. An arrangement as defined in claim 13 wherein said sealing ring comprises:
(a) a plurality of elastic concentric annular ring sections of resiliently deformable material; and (b) at least one intervening rigid ring section disposed between two respective sucessive elastic ring sections and bonded thereto.

22. An arrangement as defined in claim 13 wherein:
(a) said sealing ring has inner and outer attachment portions;
(b) said central portion and said side wall include respective grooves having axially directed faces engaging and supporting said attachment portions;
(c) said ring has a medial portion lying between and integrally connected to said attachment portions and spaced radially from the mouths of both of said grooves so as to present unsupported axially directed faces in said clearance space; and
(d) said ring has an axial dimension measured between said unsupported axially directed faces at least equal to the radial dimension of said medial portion when in a state of radial compression between said central portion and said side wall.

23. A pump for liquid comprising:
(a) a pumping chamber;
(b) an actuator mounted in said chamber and movable forwardly and reversely with respect to said chamber in a direction such as to have at least a component of movement parallel to a side wall of said pumping chamber, said actuator including:
  (i) a relatively rigid central portion having a peripheral face spaced radially inwardly of the side wall of said pumping chamber to define a clearance space therefrom;
  (ii) a sealing ring of resiliently deformable material having at least a medial portion disposed in said clearance space, said medial portion having a radial dimension in its unstressed state greater than the radial dimension of said clearance space, said sealing ring being thereby maintained in a state of radial compression between said central portion and said side wall, and said medial portion having an axial dimension in its unstressed state which is sufficiently great relatively to its radial dimension to provide fold-free axial expansion of said ring in said clearance space when under said radial compression; and
  (iii) means associated with said sealing ring for retaining said sealing ring in engagement with said central portion and with said side wall non-slidably in the direction of movement of said actuator relative to said side wall;
(c) driving means connected operatively to said actuator central portion for so moving said actuator;
(d) means defining a slug duct of predetermined length sufficient to produce a rate of flow of the liquid from said pump exceeding that corresponding to the volume swept by said actuator in its forward strokes; and
(e) pressure absorbing and restoring means communicating with said chamber for reducing the peak value of stress which would otherwise be established in said driving means, said actuator and said chamber, and including means for limiting the minimum value of pressure at which said pressure absorbing and restoring means becomes operative.

24. A pump as claimed in claim 23 wherein:
(a) said central portion of said actuator has a radial dimension measured from its center to the outermost part of its peripheral face which is at least a plurality of times greater than the minimum radial dimension of said clearance space, measured between said outermost part and the innermost part of said side wall; and
(b) the axial dimension of said medial portion of said sealing ring when in said state of radial compression is at least equal to the said minimum dimension of said clearance space.

References Cited by the Examiner

UNITED STATES PATENTS

| | | | |
|---|---|---|---|
| 594,039 | 11/1897 | Serve | 103—223 |
| 2,318,128 | 5/1943 | Tabb | 103—223 X |
| 2,407,792 | 9/1946 | McMilan | 103—150 |
| 2,732,806 | 1/1956 | Alvarez et al. | 103—151 X |
| 2,779,353 | 1/1957 | Coffey | 103—223 X |
| 2,811,925 | 11/1957 | Crookston | 103—44 |
| 2,834,299 | 5/1958 | Coffey | 103—223 X |
| 2,951,450 | 9/1960 | Fisher | 103—223 |
| 3,192,864 | 7/1965 | Notte | 103—150 |

FOREIGN PATENTS

| | | |
|---|---|---|
| 687,756 | 2/1953 | Great Britain. |

ROBERT M. WALKER, *Primary Examiner.*